(12) United States Patent
Rao (10) Patent No.: US 8,428,645 B2
(45) Date of Patent: Apr. 23, 2013

(54) MOBILE DEVICE CAPABLE OF SHARING SMS MESSAGES, EMAIL SCREEN DISPLAY LOCALLY WITH OTHER DEVICES

(76) Inventor: Bindu Rama Rao, Laguna Niguel, CA (US)

( * ) Notice: Subject to any disclaimer, the term of this patent is extended or adjusted under 35 U.S.C. 154(b) by 1301 days.

(21) Appl. No.: 11/891,193

(22) Filed: Aug. 8, 2007

(65) Prior Publication Data

US 2008/0305813 A1    Dec. 11, 2008

Related U.S. Application Data

(63) Continuation-in-part of application No. 11/810,597, filed on Jun. 5, 2007.

(51) Int. Cl.
*H04M 1/00* (2006.01)
(52) U.S. Cl.
USPC .......... 455/552.1; 455/41.2; 455/456.1; 455/550.1; 370/338; 709/226; 709/227

(58) Field of Classification Search .......... 455/41.2, 455/456.1, 550.1, 552.1; 705/1; 370/338; 709/226, 227
See application file for complete search history.

(56) References Cited

U.S. PATENT DOCUMENTS

| | | | |
|---|---|---|---|
| 7,336,928 B2* | 2/2008 | Paalasmaa et al. | 455/41.2 |
| 2006/0085823 A1* | 4/2006 | Bell et al. | 725/81 |
| 2007/0201681 A1* | 8/2007 | Chen et al. | 379/355.02 |
| 2007/0299681 A1* | 12/2007 | Plastina et al. | 705/1 |
| 2008/0139239 A1* | 6/2008 | O'Connor | 455/552.1 |
| 2008/0261524 A1* | 10/2008 | Grushkevich | 455/41.2 |

* cited by examiner

*Primary Examiner* — Amancio Gonzalez
(74) *Attorney, Agent, or Firm* — McAndrews, Held & Malloy, Ltd.

(57) ABSTRACT

Using a local sharing client, a first mobile device shares incoming calls, email, SMS messages, pictures, screen display, etc. locally (without employing a cellular wireless network) with a second device. The second device may also have a similar client and be able to share locally with the first mobile device.

33 Claims, 7 Drawing Sheets

MOBILE DEVICE CAPABLE OF SHARING SMS MESSAGES, EMAIL SCREEN DISPLAY LOCALLY WITH OTHER DEVICES

CROSS REFERENCES TO RELATED APPLICATIONS

The present application is a continuation-in-part (CIP) of U.S. patent application Ser. No. 11/810,597 entitled MOBILE DEVICE SHARING PICTURES, STREAMING MEDIA AND CALLS LOCALLY WITH OTHER DEVICES, filed on Jun. 5, 2007, which claims the benefit of U.S. Provisional Application Ser. No. 60/849,715, filed Oct. 4, 2006, and in addition, the present application makes reference to, claims priority to, and claims benefit of U.S. Provisional Application Ser. No. 60/837,664 entitled MOBILE DEVICE CAPABLE OF SHARING SMS MESSAGES, EMAIL SCREEN DISPLAY LOCALLY WITH OTHER DEVICES filed on Aug. 14, 2006. The complete subject matter of each of U.S. patent application Ser. No. 11/810,597 and U.S. Provisional Application Ser. No. 60/837,664 are hereby incorporated herein by reference, in their respective entireties.

The present application makes reference to U.S. Provisional Application Ser. No. 60/819,464 entitled MOBILE DEVICE SHARING PICTURES, STREAMING MEDIA AND CALLS LOCALLY WITH OTHER DEVICES, filed on Jul. 7, 2006, the complete subject matter of which is hereby incorporated herein by reference, in its entirety.

BACKGROUND

1. Technical Field

The present invention relates generally to the interactions between mobile device and other devices, and more specifically to the localized sharing of email, SMS and other content with other mobile devices.

2. Related Art

Electronic devices, such as mobile phones and personal digital assistants (PDA's), often contain small screens with very limited viewing area. They are constrained in terms of how much information can be displayed, and in terms of user interaction capabilities. Quite often when a user gets a phone call, he cannot let his friends in proximity listen to the voice conversation conducted over the phone, especially if the premises is noisy. Some phones have a speakerphone that can be used to amplify the phone conversation such that it can be heard by a few individuals who are close to the phone. However, this requires all the individuals who want to hear the conversation to be very close to the phone. Thus sharing incoming voice calls with others who want to listen to it, especially in noisy premises and in locations where people cannot huddle close to the phone, is quite impossible if not impractical. Conference call facilities are available on a cell phone. However, it is more expensive in terms of call time and it also requires the use of additional network resources. Thus, there is no easy way to share an incoming call with others who want to listen to it, especially in crowded or noise places and in places where people are not too close to each other although they are in the vicinity.

Sometimes, when a user receives a SMS message, the user may want to share it with a friend or spouse in physical proximity, but yet not close enough to view the mobile device. However, forwarding or resending the received SMS to share it with others will incur additional charges, and will also require the availability of the wireless network and services, which may be inaccessible. Similarly, email received by a user cannot be shared with others in close proximity without rerouting it back to the wireless network and back to the mobile devices of the others. In addition, there may be additional costs incurred or resources needed to forward the emails (as is done over the Internet typically).

In general, for a user of a mobile device to share the information displayed on the mobile device with others in proximity, the user has to ask them to assemble around the mobile device and make them view the display on the mobile device. This is fairly limiting and not a good user experience, especially since the screen on the mobile devices are small and not convenient for simultaneous viewing by a group of people.

Quite often a user may want to share the content on his mobile device. The user has no easy way to share the viewing or listening experience with others in the premises without using the wireless network (to reroute the data/information for sharing), with extra costs associated with such sharing, and with the need to have the wireless network currently accessible and available. For example, this may not be possible inside buildings or tunnels or trains where wireless network access is often a problem.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The numerous objects and advantages of the present invention may be better understood by those skilled in the art by reference to the accompanying figures in which.

DETAILED DESCRIPTION OF THE DRAWINGS

Figure 1:
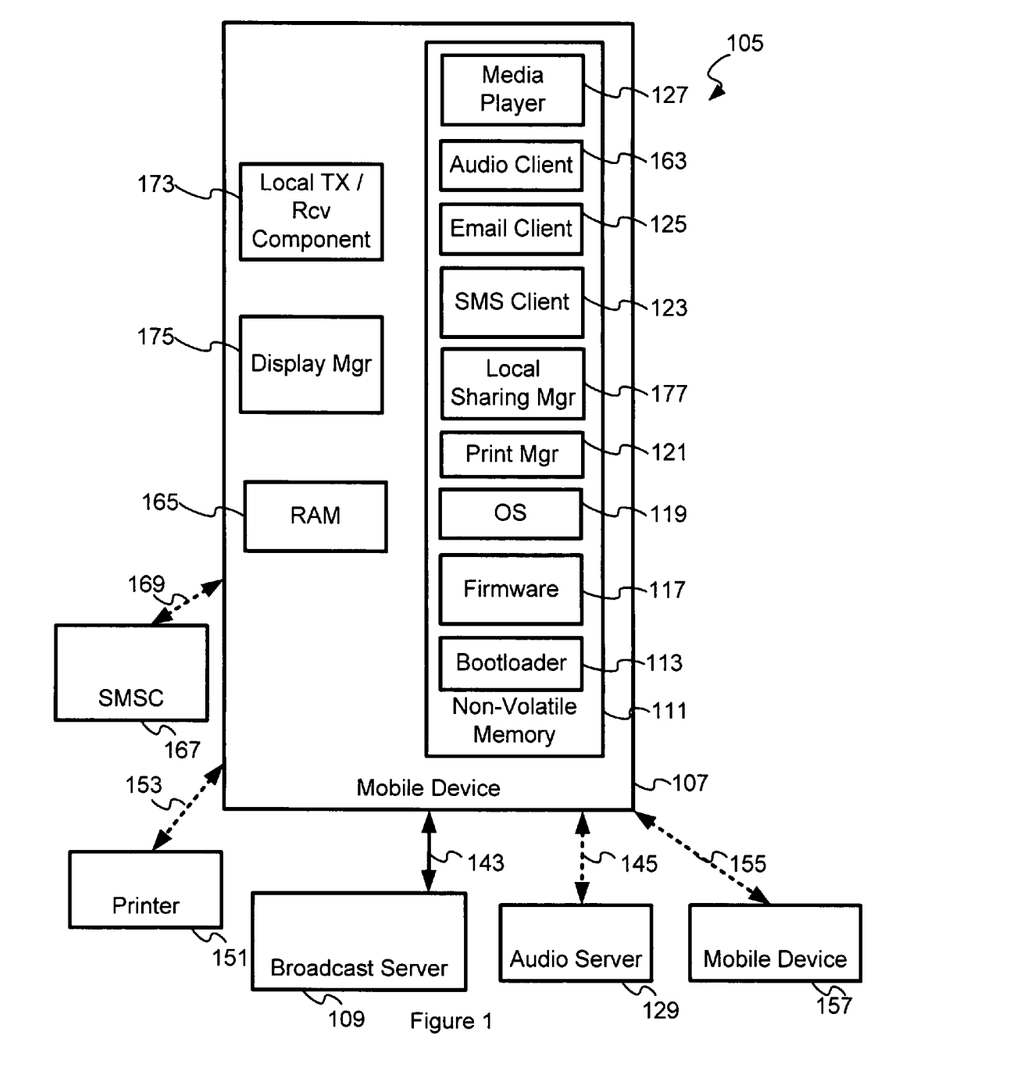
FIG. 1 is a perspective diagram of a mobile device that is capable of locally sharing emails, SMS messages and data displayed on the mobile device with other devices in proximity, such as the mobile device.

FIG. 1 is a perspective diagram of a mobile device 107 that is capable of locally sharing emails, SMS messages and data displayed on the mobile device 107 with other devices in proximity, such as the mobile device 157. The mobile device 107 is part of a network 105, such as a wireless network, with access to voice and data services that make it possible for it to receive SMS, email and other types of data. The mobile device 107 is communicatively coupled with an SMSC 167 that provides SMS messages sent by other people, that can be viewed on the mobile device 107. It is also communicatively coupled to a broadcast server 109 and an audio server 129 via a WLAN or cellular wireless connections. The mobile device 107 can be used by an user to download audio and video content such as mp3, wma, MPEG2, MPEG3, etc. The mobile device 107 is communicatively coupled with the broadcast server 109, such as a DVBH server or a TV broadcast station, and to an audio server 129, such as an Apple iTunes server, a real-audio based streaming server, etc.

The mobile device 107 employs a local sharing manager 177 that makes it possible to share data with other mobile devices, such as a mobile device 157, for specific types of data managed or manipulated by client applications. For example, an email received by the email client 125 in the mobile device 107 is shared with the mobile device 157. Similarly, an SMS message received by the SMS client 123 in the mobile device 107 is shared with the mobile device 157. The local sharing manager 177 in the mobile device 107 facilitates the sharing of the SMS messages and the email messages with other devices in proximity, such as the mobile device 157 in local communication proximity.

In one embodiment, the email client 125 receives an email message from a mail server (such as an Exchange server) and the user reviews the email message received. When the user then decides to share the received email message with his spouse or friend using the mobile device 157, the user activates a local sharing key, for example a soft key. In response, the received email message is transferred to the mobile device 157 for local sharing, i.e. for display on the mobile device 157. Specifically, the email client 125 responds to the activation of the local sharing key by determining the email to be shared, packing the email data into a email packet for transfer to the mobile device 157, communicating the email packet to the local sharing manager of the mobile device 157, and confirming the communication of the email packet to the user of the mobile device 107 (such as via a display of a message box).

In one embodiment, the SMS client 123 receives a SMS message from a SMSC server (in a wireless network) and the user reviews the SMS message received. When the user then decides to share the received SMS message with his spouse or friend using the mobile device 157, the user activates a local sharing key, for example a soft key. In response, the received SMS message is transferred to the mobile device 157 for local sharing, i.e. for display on the mobile device 157. Specifically, the SMS client 123 responds to the activation of the local sharing key by determining the SMS message to be shared, packing the SMS data into a SMS packet for transfer to the mobile device 157, communicating the SMS packet to the local sharing manager of the mobile device 157, and confirming the communication of the SMS packet to the user of the mobile device 107 (such as via a display of a message box).

The mobile device 107 employs a local transmission and reception component 173, which is often a low power communication means such as Bluetooth, to communicate with the mobile device 157. The local sharing manager 177 in the mobile device 107 manages the establishment of the communication with the mobile device 157 and the subsequent local sharing, and the local transmission and reception component 173 supports local sharing as and when required, by providing one way, two way local or multi-point communication means (as necessary) between the mobile device 107 and the mobile device 157. For example, to locally share email and SMS messages, in one embodiment, the local transmission and reception component 173 provides a one-way communication such that the mobile device can share an email packet or an SMS packet with the mobile device 157.

The local sharing manager 177 facilitates sharing of instant messages, SMS messages and email messages received by the mobile device 107, such sharing occurring without the use of the cellular wireless network (or the wireless LAN network) on which the mobile device 107 typically operates. Thus, the local transmission and reception component 173 employs a protocol other than the RF protocols used for GSM or CDMA based wireless networking. It is based on protocols used for low power communication of devices that are in proximity, such as devices that are within 1 feet to 30 feet of each other, such as Bluetooth, or in some cases, 802.11 based protocols.

The local sharing manager 177 makes it possible to share the content currently being rendered, played or displayed by a mobile device 107, with another mobile device 157 in its vicinity. The sharing client 175 also makes it possible to share the audio content currently being rendered, played or displayed by an audio client/player 163 in the mobile device 107. For example, the audio client 163 may be an Apple iTunes client, another MP3 player client, etc. In one embodiment, the local sharing manager 177 simultaneously conducts local sharing, such as that of an email as well as a streaming audio, etc.

The local sharing manager 177 makes it possible to share specific stored or streaming content (audio, or video) that is currently being displayed, played or rendered by a typical client in the mobile device 107, (such as the audio client 163 or the media player 127) with another mobile device in its proximity, such as the mobile device 157.

In one embodiment, the recipient mobile device 157 also comprises a local sharing manager 177 that is capable of negotiating sharing of email, SMS, media streams and other content with the local sharing manager 177 of the source mobile device 107. For example, it is capable of negotiating a channel for communication, buffer sizes, etc. In a related embodiment, the recipient mobile device 157 also comprises local sharing manager 177 that is capable of temporarily suspending sharing when an incoming phone call is received on it. It is also able to terminate sharing and letting local sharing manager 177 of the source mobile device 107 know that it is pausing or terminating sharing. In general, the recipient mobile device 157 is capable of starting, stopping, pausing and otherwise controlling the sharing of media streams and content with the local sharing manager 177 of the source mobile device 107.

The mobile device 107 is also capable of printing emails, SMS pictures, etc. using the local sharing manager 177, a printer manager 121, a printer 151 being used to print them using local sharing means. In one embodiment, the printer 151 comprises a local sharing manager component that makes it possible for the mobile device 107 to interact with and communicate the email, SMS message, picture and other information to the printer 151. In a related embodiment, the printer 151 employs an adapter (wireless or wired) that provides it with the facilities needed to interact with the mobile device 107 to provide local sharing printing support.

A display manager 175 in the mobile device 107 is used to manage what is displayed in the display of the mobile device 107. It is used to manage the display of text, graphics, video, etc. on an LCD screen (or other screens) on the mobile device. The display manager is implemented as hardware (chipset) in one embodiment and as a combination of hardware and software in another embodiment. The display manager 175 is used to print whatever is currently displayed in the mobile device 107, onto the printer 151. It employs the services of a print manager 121 to conduct printing on the printer 151, which in turn employs the services of the local sharing manager 177, if necessary, to establish communications with the printer 151 employing local sharing means.

Figure 2:
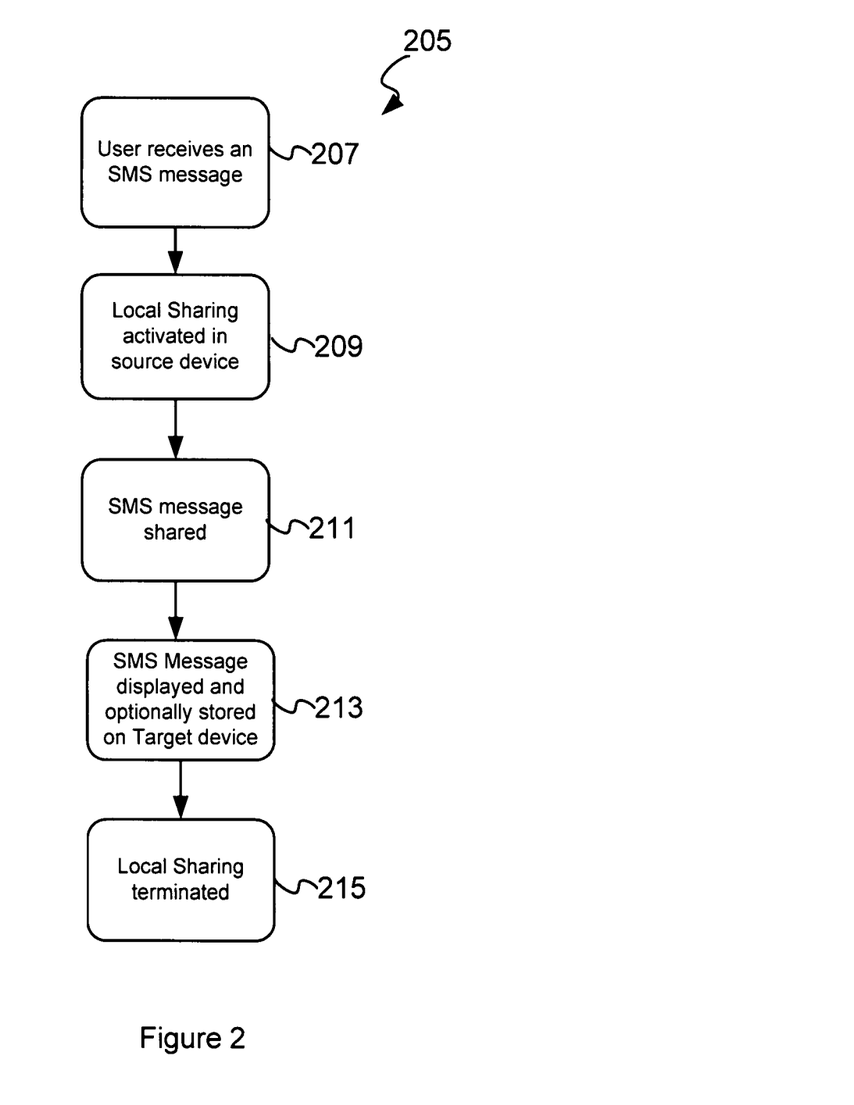
FIG. 2 is a flow chart showing typical usage of a source mobile device, in accordance with the present invention, for sharing a SMS message received by the source mobile device with another recipient mobile device.

FIG. 2 is a flow chart 205 showing typical usage of a source mobile device 107, in accordance with the present invention, for sharing a SMS message received by the source mobile device 107 with another recipient mobile device 157. At a start block 207, the source mobile device receives a SMS message that a user can choose to view. Then the user can store it locally on the mobile device, delete it, or store it on the network side on a server. Then, at a next block 209, the local sharing manager 177 is activated in the source mobile device 107 by the user in order to share the received SMS message, which typically is the currently viewed SMS, with another person in communicative proximity (local communication, not using the cellular wireless network or equivalent IP based networks). In one embodiment, the user is prompted with a list of users (names of users) with whom the user can conduct local sharing, such a list having been registered previously with the local sharing manager 177. In a related embodiment, the local sharing manager 177 determines a list of currently available local sharing participants among a previously registered list of local sharing participants and lets a user choose one or more of the currently available local sharing participants (i.e. their mobile devices) as targets for sharing. The local sharing may be preconfigured such that the list of one or more recipient devices is known to the source mobile device 107. In one embodiment, the local sharing may also be accompanied by a discovery process where, based on user input that is solicited, or based on pre-configured preferences, the local sharing manager 177 discovers the target devices (such as mobile device 157) and starts negotiating the transmission of the SMS packet (or email, screen dump, etc.) to the target device(s).

Then at a next block 211, transmission of the SMS packet that comprises the SMS message occurs for the purposes of sharing locally with one or more recipient devices. The SMS client determines the content of the SMS packet, and communicates it to the local sharing manager 177 for communication to the target devices. The local sharing manager then interacts with the local transmission and reception component 173 to have the SMS packet (data packets in general) sent to the target device(s). In a related embodiment, the SMS client determines the content of the SMS packet, and communicates it directly to local transmission and reception component 173 for communication to the target device(s).

At a next block 213, receiving of the locally shared SMS packet for sharing is initiated in the target mobile device(s). The user of the target device can view the displayed SMS packet, and optionally store it. For example, the locally sharing manager in the mobile device 157 receives the locally shared SMS packet and communicates it to the SMS client in the mobile device 157 for display to the user of the mobile device 157. The user is also provided with an opportunity to save it locally in the mobile device 157.

Then, at a next block 215, the transmission of the locally shared data, such as the SMS packet, is terminated.

Figure 3:
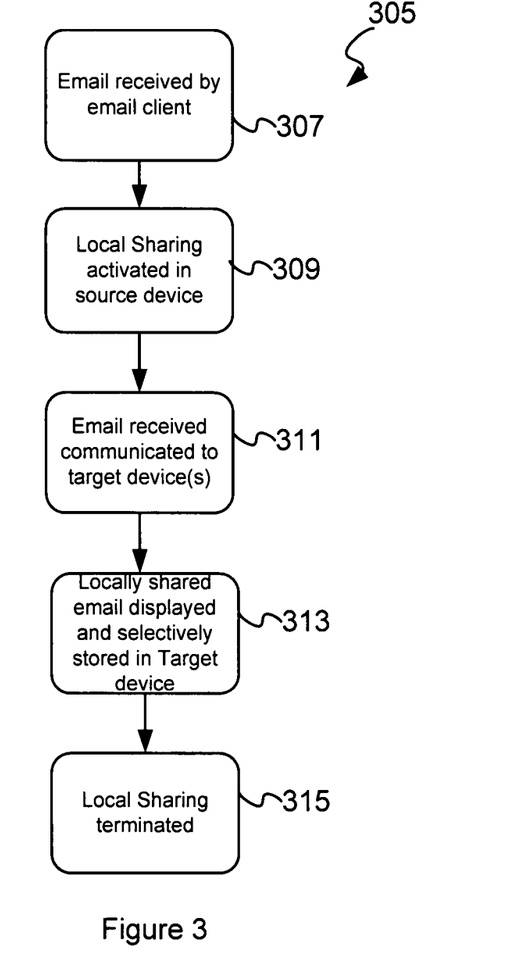
FIG. 3 is a flow chart showing typical usage of a source mobile device, in accordance with the present invention, for sharing an email message received by the source mobile device with another target mobile device.

FIG. 3 is a flow chart 305 showing typical usage of a source mobile device 107, in accordance with the present invention, for sharing an email message received by the source mobile device 107 with another target mobile device 157. At a start block 307, the email client in the source mobile device 107 receives an email message that a user can choose to view. The user can store it locally on the mobile device 107, delete it, or store it on the network side on a server. Then, at a next block 309, the local sharing manager 177 is activated in the source mobile device 107 by the user, in order to share the received email message, which typically is the currently viewed email in the email client, with another person in communicative proximity (local communication, not using the cellular wireless network or equivalent IP based networks). In one embodiment, the user is prompted with a list of users (names of users) with whom the user can conduct local sharing, such a list having been registered previously with the local sharing manager 177. In a related embodiment, the local sharing manager 177 determines a list of currently available local sharing participants among a previously registered list of local sharing participants and lets a user choose one or more of the currently available local sharing participants (i.e. their mobile devices) as targets for sharing. The local sharing may be preconfigured such that the list of one or more recipient devices is known to the source mobile device 107. In one embodiment, the local sharing may also be accompanied by a discovery process where, based on user input that is solicited, or based on pre-configured preferences, the local sharing manager 177 discovers the target devices (such as mobile device 157) and starts negotiating the transmission of the email packet (or SMS, screen dump, etc.) to the target device(s).

Then at a next block 211, transmission of the email packet that comprises the email message occurs for the purposes of sharing locally with one or more recipient devices. The email client determines the content of the email packet, and communicates it to the local sharing manager 177 for communication to the target devices. The local sharing manager then interacts with the local transmission and reception component 173 to have the email packet (data packets in general) sent to the target device(s). In a related embodiment, the email client determines the content of the email packet, and communicates it directly to local transmission and reception component 173 for communication to the target device(s).

At a next block 313, receiving of the locally shared email packet for sharing is initiated in the target mobile device(s). The user of the target device can view the displayed email message in the email packet, and optionally store it. For example, the locally sharing manager in the mobile device 157 receives the locally shared email packet and communicates it to the email client in the mobile device 157 for display to the user of the mobile device 157. The user is also provided with an opportunity to save it locally in the mobile device 157.

Then, at a next block 315, the transmission of the locally shared data, such as the email packet, is terminated.

It should be noted that the sharing of a current email can be terminated by the user of the source mobile device. In addition, the recipient device also facilitates termination of sharing of the email, such as when it determines that it is about to receive its own incoming voice call.

Figure 4:
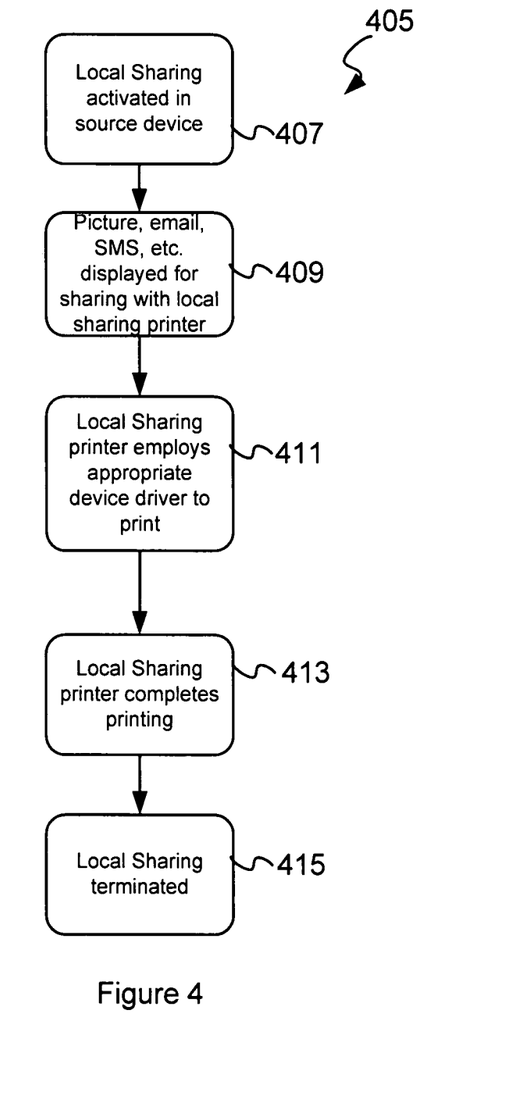
FIG. 4 is a flowchart of a local sharing mobile device wherein a local sharing manager in the local sharing mobile device manages printing with a local sharing printer in its proximity.

FIG. 4 is a flowchart of a local sharing mobile device 107 wherein a local sharing manager in the local sharing mobile device 107 manages printing with a local sharing printer in its proximity. At a start block 407, the local sharing manager 177 is activated in the source mobile device 107. The local sharing manager 177 facilitates the discovery of other devices in proximity, including a local sharing printer, if any. In one embodiment, where the connectivity with other devices for sharing is over Bluetooth protocols, it discovers other Bluetooth devices and establishes pairing with them.

Then, at a next block 409, the user displays a picture using a picture client or a camera client, an email using an email client, an instant message using an IM client, etc. The display manager 175 facilitates the display of the email message, the picture, etc. Such a display manager 175 is equipped with the capability to share the displayed content with a local sharing printer, such as the printer 151. The user has to activate printing with a local sharing printer and the local sharing printer is sent the appropriate printing data packet comprising the picture, email, SMS message, etc.

Then, at a next block 411, the local sharing printer employs the appropriate device driver to print the information being shared. To print emails and SMS messages, it employs a simple text print driver. To print a picture, the whole screen (current screen) or an image, it employs a image print driver. Thus, appropriate drivers are employed for the different types of data being printed.

Then, at a next block 413, at the end of the data transfer, such as a picture, the printing is completed. Then, at a next block 415, the local sharing is terminated. In one embodiment, all established local connections are also terminated. In another embodiment, all established local connections are continued in anticipation of a subsequent media sharing event.

Figure 5:
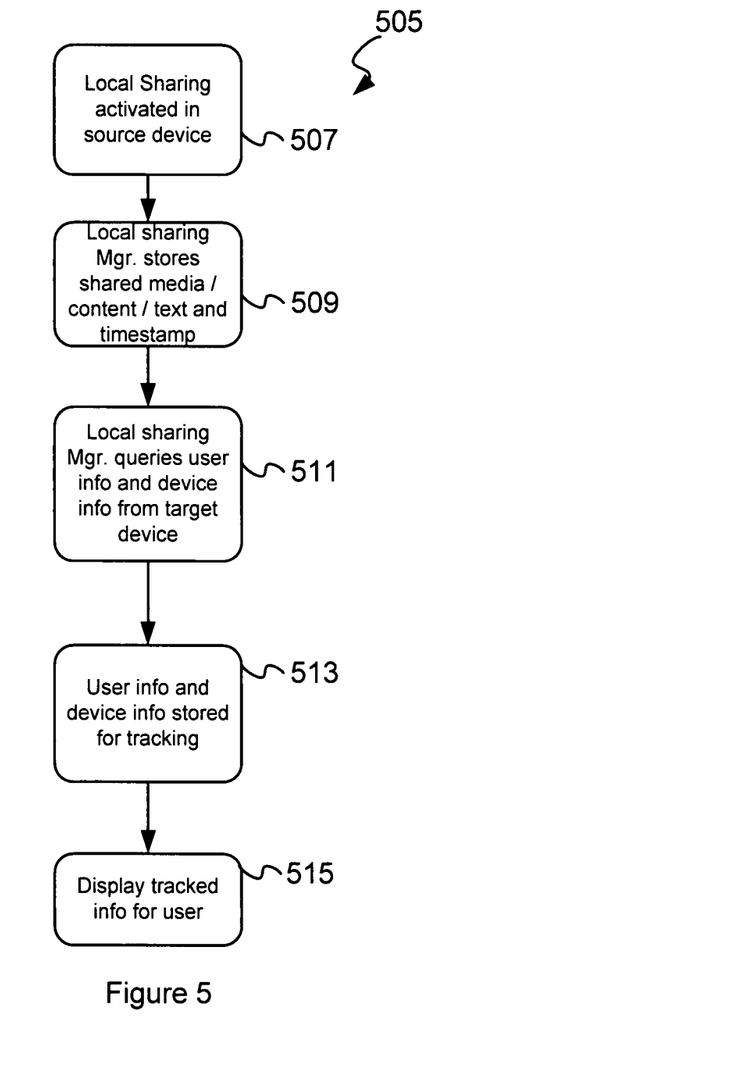
FIG. 5 is a flowchart 505 that shows the operations of local sharing mobile device 107 as it provides tracking functionality for shared data.

FIG. 5 is a flowchart 505 that shows the operations of local sharing mobile device 107 as it provides tracking functionality for shared data. The mobile device 107 is capable of local sharing and tracking of shared data by means of low-power local broadcasts. Local sharing broadcasts can be terminated either by a user of the sharing device or at the end of a local sharing episode, such as the end of a media stream or data that is broadcast.

At a start block 507, the local sharing manager of the source mobile device 107 is activated. The user can activate it to share received or played media, or the local sharing manager is configured to be activated when specific types of events occur, such as the receipt of email, the receipt of SMS messages, the receipt of incoming calls or the download of a song. Then, at a next block 509, local sharing occurs. For example, the low power broadcast of the media stream or media content currently being played in the source mobile device is initiated. Such broadcasts can be over a local FM radio frequency channels, over Bluetooth connections, over IrDA links, over WLAN connections, etc. In addition, the locally shared media, email, SMS, etc. is stored along with a log of the user with whom such sharing occurs, the timestamp of the sharing event, the device details of the target/recipient sharing mobile device(s), etc. For example, the tracking of the sharing event may comprise of information regarding the media or content being shared locally, the timestamp of when the sharing occurred, a target/recipient device details, user details if available, etc. Such information can be used for charging record creation, which may be subsequently used for billing purposes.

Then, at a next block 511, if user info and device detail information is not available, the local sharing manager of the source mobile device 107 queries user info and device information from the target mobile device(s) 157. Then, at a next block 513, the user information and device information are stored for tracking purposes. Finally, at the next block 515, the tracking information is displayed to the user at the end of the local sharing episode. In one embodiment, the user information and device information are not stored for tracking purposes in the block 513. Instead, at the end of the local sharing episode at the block 515, the display of tracked information, i.e. the user information and the device information and associated timestamp, occurs, with a prompt to the user to store the tracking information. If the user agrees to store the tracking information, then it is locally stored in the locally sharing source mobile device 107. In a different embodiment, the tracking also occurs in the target mobile device(s) 157 at the end of the local sharing episode.

In one embodiment, the local sharing, such as media broadcasts and sharing of email, SMS etc., are continued regardless of the presence of at least one listener, i.e. a recipient mobile device 157. In a different embodiment, the source mobile device 107 is able to determine if at least one recipient mobile device 157 is currently connected and able to listen to the shared media stream and the source mobile device 107 does not broadcast or locally share if it determines that no recipient mobile device 157 is currently able to receive the broadcasts (i.e. not connected or in the range on the low powered local broadcasts).

In one embodiment, a source mobile device 107 and a target client device 157 share media and textual messages (email, SMS, etc.) locally when the source mobile device 107 receives a media stream (such as a download of an MP3 song, or an incoming voice phone call) or email, SMS etc. The local sharing is setup by selecting a common communication channel, such as a FM station on the target mobile device(s) and the same FM station on the source mobile device 107.

Figure 6:
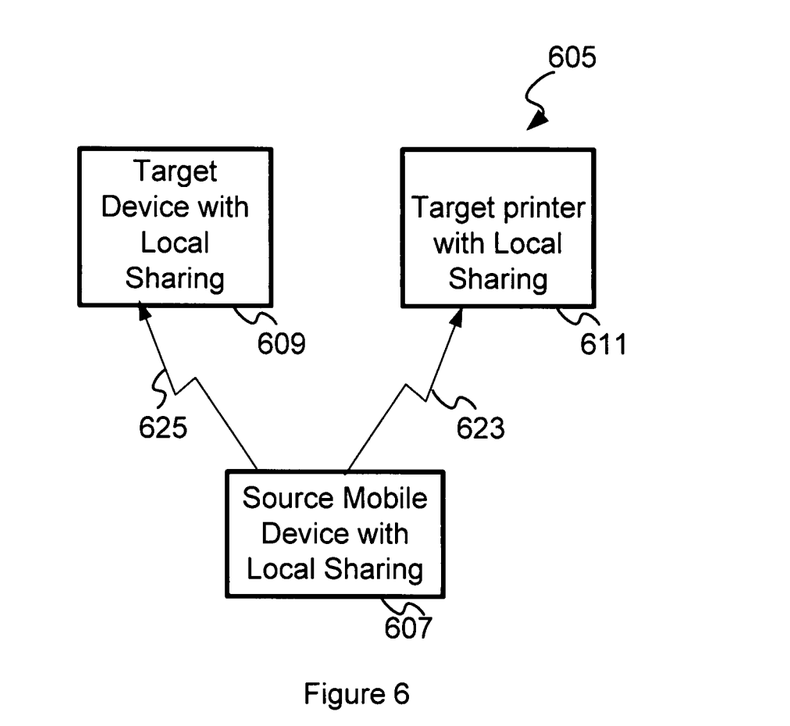
FIG. 6 is a perspective block diagram of a local sharing network wherein more than one target devices can share media streams, emails, SMS messages, etc. locally with a source mobile device.

FIG. 6 is a perspective block diagram of a local sharing network wherein more than one target devices 609, 611 can share media streams, emails, SMS messages, etc. locally with a source mobile device 607. Low power local communication means such as Bluetooth connectivity or IrDA, etc. are used for locally sharing data. The source mobile device with Bluetooth 607 is capable of broadcasting media streams to more than one listening client devices 609, 611 over Bluetooth connections. Thus incoming emails, SMS messages, voice calls, downloaded streaming audio songs, etc. are shared with one or more listening client devices 609, 611 by a source mobile device 607.

In one embodiment, a Bluetooth based broadcast of locally sharable data, such as screen shots or pictures taken by a camera, is facilitated by the local sharing manager 177. Bluetooth radios connect to each other in piconets, which are formed by a master radio simultaneously connecting up to seven slave radios. As such, in a related embodiment, up to seven target listening devices are able to receive shared media streams transmitted by a source mobile device 107, such as a mobile phone.

In particular, the source mobile device with local sharing 607 is capable of sharing email, SMS messages, pictures, etc. with the target device with local sharing 609 but also with a target printer with local sharing 611.

Figure 7:
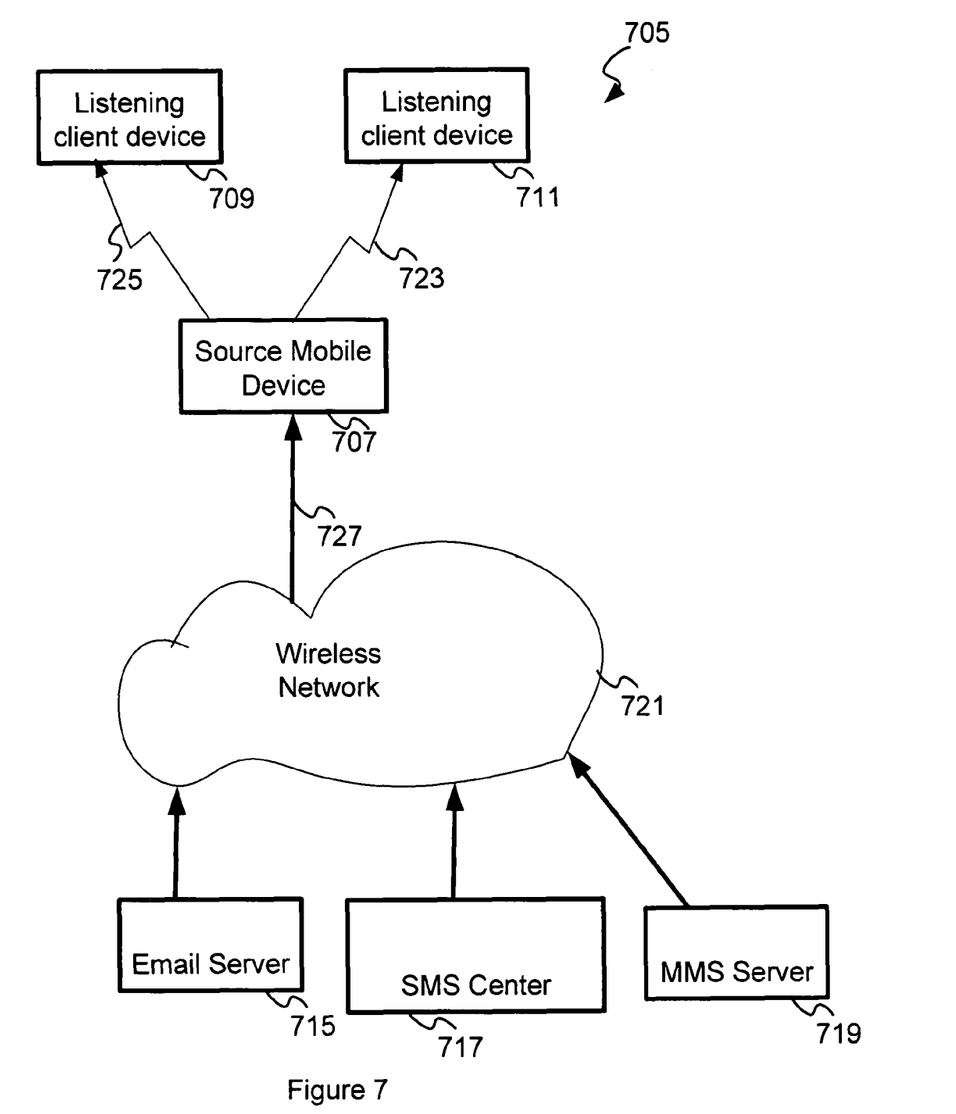
FIG. 7 is a perspective block diagram of a local sharing environment wherein a wireless network provides various kinds of data services to a source mobile device, such as email, SMS, MMS and broadcast media.

FIG. 7 is a perspective block diagram of a local sharing environment 705 wherein a wireless network 721 provides various kinds of data services to a source mobile device 707, such as email, SMS, MMS and broadcast media. The source mobile device 707 is capable of receiving online broadcast data, email messages, SMS messages, multi-media messages as well as voice calls. The source mobile device 707 receives them and shares them locally with one or more listening client devices 709, 711. The local sharing conducted by the mobile device 707 with the one or more listening client devices 709, 711 does not involve the wireless network 721. Only the source mobile device 707 is directly connected to or associated with the wireless network 721. The listening clients 709, 711 may not even be on the same wireless network 721—instead they may be subscribers of a different wireless (or wired) network altogether.

The source mobile device 707 employs 3G, GPRS, GSM, VOIP, CDMA, WCDMA, UMTS or other standard wireless protocols to interact with the wireless network 721, and with an email server 715, an SMS center 717, an MMS serve 719 or a call client device via the wireless network 721. It uses other low power local sharing protocols to locally share content, such as received emails, SMS messages, MMS messages, voice calls or streaming media, with the listening client devices 709, 711. For example, it employs Bluetooth or 802.11 based protocols for local sharing.

A set of menus are provided by the source mobile device 707 to let the user initiate local sharing, provide information that can help in the configuration of local sharing and for the termination of local sharing of received calls and broadcast/multicast media. Broadcast media received are retransmitted to the local client devices 709, 711, over different communication means than the one they are received on. Multicast media may selectively forwarded to local client devices 709, 711 using appropriate protocol translations or bridging.

In general, the source mobile device 107 and the target device 157 (which may or may not be a mobile device) are capable of communicating over a locally sharing communication means, that is different from a wireless communication means, such as 3G, GSM, CDMA, GPRS, etc. typically employed for communication between the first mobile device 107 and a wireless network with which it is associated.

Using a local sharing manager, the mobile device 107 shares incoming calls, email, SMS messages, MMS messages, streaming media, pictures, etc. locally (without employing the cellular wireless network) with a target mobile device 157. The target mobile device 157 may also have a similar local sharing manager and be able to share locally with the mobile device 107.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The terms "media" and "content" as used herein may refer to music, recorded voice inputs that a user records, videos, and multimedia information accessed by a user. The media and content may be received by a mobile device in MP3 format, AMR format, WMA format, AVI format, MPEG formats, DVD formats, HDDVD formats, etc.

The term "SMS" as used herein may refer to a textual content delivered over a text based messaging system, such as a text message service that can be provided over a WAP bearer (for example). It includes text messaging over IP networks, such as SMS over IP.

The term "email" as used herein may refer to textual and multi-media content delivered over an electronic mail service, such as mail and files delivered over a push or pull based mail delivery service. It includes textual and multi-media content delivered via a client pull service or a server push service.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A mobile device that receives a mobile service in a wireless network, the mobile device comprising:
   at least one non-volatile memory having stored therein one or both of firmware and software;
   a bearer communication circuitry;
   a local communication circuitry;
   at least one processor operably coupled to the bearer communication circuitry, the local communication circuitry and the at least one non-volatile memory, wherein the at least one processor, during operation, at least:
   receives a mobile content employing the bearer communication circuitry;

shares at least one portion of the mobile content locally employing the local communication circuitry with at least one of a plurality of mobile devices in its proximity;

stores a log of users with whom local sharing of the mobile content occurs;

wherein local sharing of the mobile content is terminated or temporarily paused, when the mobile device receives an incoming call, and can be resumed subsequently, based on a user preference; and manages the sharing of the at least one portion of the mobile content with the at least one of a plurality of mobile devices in its proximity.

2. The mobile device of claim 1 further comprising:
a local communication protocol software that employs the local communication circuitry for communication with the at least one of a plurality of mobile devices in its proximity;
the at least one processor, during operation, in addition at least:
receives information indicating that the at least one of a plurality of mobile devices in its proximity is a target device for sharing;
establishes local communication with the at least one of a plurality of mobile devices in its proximity over the local communication protocol, if necessary or determines that the mobile device is communicatively coupled with the at least one of a plurality of mobile devices in its proximity over the local communication protocol; and
selectively initiates sharing of the mobile content with the at least one of a plurality of mobile devices in its proximity.

3. The mobile device of claim 1 wherein the mobile content is an email received by an email client in the mobile device that is shared with the at least one of a plurality of mobile devices in its proximity over the local communication circuitry.

4. The mobile device of claim 1 wherein the mobile content is a streaming audio received by an audio client in the mobile device, the mobile device sharing the streaming audio with the at least one of a plurality of mobile devices in its proximity over the local communication circuitry.

5. The mobile device of claim 1 wherein the mobile content is one of a streaming video or a television program received by a video client in the mobile device, the mobile device sharing the mobile content with the at least one of a plurality of mobile devices in its proximity over the local communication circuitry.

6. The mobile device of claim 1 further comprising:
a local sharing manager that facilitates sharing mobile content currently being rendered, played or displayed by the mobile device, with the at least one of a plurality of mobile devices in its proximity over the local communication circuitry.

7. The mobile device of claim 6 wherein the local sharing manager conducts simultaneous local sharing of more than one mobile content from a set of mobile content comprising an email, a streaming audio, a video and a television program with the at least one of a plurality of mobile devices.

8. The mobile device of claim 6 wherein the local sharing manager queries at least one of user information, subscriber information and device information from the at least one of a plurality of mobile devices in its proximity with which it conducts local sharing and stores them for tracking purposes.

9. The mobile device of claim 1, further comprising:
a local sharing manager;
an email client;
an SMS client;
an audio client;
a media player;
the at least one processor, during operation, in addition at least:
initiates the sharing of the mobile content wherein the mobile content is one an email received by the email client, an SMS received by the SMS client, an audio content received by the audio client, and an interactive media received by the media player;
establishes local communication with the at least one of a plurality of mobile devices in its proximity over the local communication protocol; and
manages the sharing and termination of sharing with the at least one of a plurality of mobile devices employing the local sharing manager.

10. A method performed by a mobile device that receives mobile content over a wireless network, the method comprising:
receiving, over the wireless network, the mobile content employing a bearer communication circuitry;
sharing at least one portion of the mobile content locally, employing a local communication circuitry, with a second mobile device in its proximity;
managing the sharing of the at least one portion of the mobile content with the second mobile device until the sharing is terminated by the mobile device or the second mobile device indicates termination of sharing;
storing a log of users with whom local sharing of the mobile content occurs; and
wherein local sharing of the mobile content is terminated or temporarily paused, when the mobile device receives an incoming call, and can be resumed subsequently, based on a user preference.

11. The method of claim 10 further comprising:
determining a list of users with whom a user of the mobile device can currently conduct local sharing;
prompting the user of the mobile device with the list of users;
noting a user's selection from the list of users; and
employing the user's selection in sharing the at least one portion of the mobile content locally.

12. The method of claim 11 wherein the determining of the list of users comprises:
identifying a previously registered list of local sharing participants; and
verifying which of the registered list of local sharing participants are currently available for local sharing.

13. The method of claim 11 wherein the determining of the list of users comprises:
discovering target devices from a plurality of mobile devices in a communication range; and
negotiating the communication of the mobile content to the target devices wherein the mobile content is one of a SMS message, an email, a screen dump, and a streaming media.

14. The method of claim 10 wherein the sharing of the at least one portion of the mobile content locally does not involve the wireless network.

15. The method of claim 10 wherein the mobile device is directly connected to or associated with the wireless network and the second mobile device is directly connected to or associated with a different wireless network.

16. A mobile device communicatively coupled to a first network, the mobile device comprising:
a local sharing communication circuitry;
a local sharing client;
the local sharing client employing the local sharing communication circuitry to locally share content with a target mobile device communicatively coupled to a second network;
wherein the mobile device stores a log of users with whom local sharing of the mobile content occurs;
wherein local sharing of the content is terminated or temporarily paused, when the mobile device receives an incoming call, and can be resumed subsequently, based on a user preference; and
wherein the content is one of an incoming call, an email received, a SMS message received, an instant message received, a picture, a screen display, an audio data and a video data.

17. The mobile device of claim 16 wherein the local sharing of content by the local sharing client occurs without employing either the first network or the second network for local sharing.

18. The mobile device of claim 16 wherein the local sharing of content by the local sharing client occurs for storing the content in a storage associated with the target mobile device, wherein the target mobile device is capable of subsequently displaying the locally shared content.

19. The mobile device of claim 16 further comprising:
a tracking component that tracks the local sharing of the content by the local sharing client with the target mobile device; and
the tracking component facilitating the communication of a charging record identifying at least the content, the target mobile device and a timestamp.

20. The method of claim 10 wherein the mobile device is directly connected to or associated with the wireless network managed by a first operator and the second mobile device is directly connected to or associated with a different wireless network managed by a second operator.

21. The method of claim 10 wherein the log comprises a time stamp of when sharing occurred and information about the second mobile device.

22. The method of claim 10 wherein the log comprises information about a subscriber for the second mobile device.

23. The method of claim 10 wherein the local sharing comprises simultaneously sharing a first content with the second mobile device and a separate second content with a third mobile device.

24. The mobile device of claim 1 wherein the mobile content is audio of a voice call received by the mobile device using the bearer communication circuitry, and wherein the mobile device shares the mobile content with the at least one of a plurality of mobile devices in its proximity over the local communication circuitry.

25. The mobile device of claim 24 wherein the at least one of the plurality of mobile devices with which mobile content is shared comprises bearer communication circuitry for communication over a cellular wireless network.

26. The mobile device of claim 1 wherein the bearer communication circuitry communicates over a cellular wireless network.

27. The mobile device of claim 26 wherein the mobile device comprises a cellular telephone.

28. The mobile device of claim 1 wherein the log comprises a time stamp of when sharing occurred and information about the at least one of a plurality of mobile devices.

29. The mobile device of claim 1 wherein the log comprises information about a subscriber for the at least one of a plurality of mobile devices.

30. The mobile device of claim 1 wherein the local sharing comprises simultaneously sharing a first content with the at least one of a plurality of mobile devices and a separate second content with another of the plurality of mobile devices.

31. The mobile device of claim 16 wherein the log comprises a time stamp of when sharing occurred and information about the target mobile device.

32. The mobile device of claim 16 wherein the log comprises information about a subscriber for the target mobile device.

33. The mobile device of claim 16 wherein the local sharing comprises simultaneously sharing a first content with the target mobile device and a separate second content with a third mobile device.

* * * * *

UNITED STATES PATENT AND TRADEMARK OFFICE
CERTIFICATE OF CORRECTION

| | | |
|---|---|---|
| PATENT NO. | : 8,428,645 B2 | Page 1 of 1 |
| APPLICATION NO. | : 11/891193 | |
| DATED | : April 23, 2013 | |
| INVENTOR(S) | : Rao | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1410 days.

Signed and Sealed this
Thirtieth Day of December, 2014

Michelle K. Lee
*Deputy Director of the United States Patent and Trademark Office*